United States Patent
Quijano

(10) Patent No.: US 8,576,554 B2
(45) Date of Patent: Nov. 5, 2013

(54) POWER SUPPLY CONTAINMENT DEVICE

(75) Inventor: David Quijano, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 234 days.

(21) Appl. No.: 13/090,039

(22) Filed: Apr. 19, 2011

(65) Prior Publication Data

US 2012/0268892 A1 Oct. 25, 2012

(51) Int. Cl.
*G06F 1/16* (2006.01)
*H05K 5/00* (2006.01)
*H05K 7/00* (2006.01)

(52) U.S. Cl.
USPC .................................................. 361/679.23

(58) Field of Classification Search
USPC ............................ 361/679.21, 679.23, 679.58
See application file for complete search history.

(56) References Cited

U.S. PATENT DOCUMENTS

| | | | | |
|---|---|---|---|---|
| 5,169,221 A * | 12/1992 | Wheeler | | 312/323 |
| 5,568,359 A * | 10/1996 | Cavello et al. | | 361/679.43 |
| 5,701,347 A * | 12/1997 | Daniels et al. | | 381/300 |
| 5,729,478 A * | 3/1998 | Ma et al. | | 361/679.41 |
| 5,870,280 A * | 2/1999 | Cho | | 361/679.07 |
| 6,010,111 A * | 1/2000 | Cho | | 248/346.06 |
| 6,032,918 A * | 3/2000 | Cho | | 248/688 |
| 6,049,454 A * | 4/2000 | Howell et al. | | 361/679.41 |
| 6,134,103 A * | 10/2000 | Ghanma | | 361/679.05 |
| 6,168,124 B1 * | 1/2001 | Matsuoka et al. | | 248/176.1 |
| 6,206,593 B1 * | 3/2001 | Brenner et al. | | 400/693 |
| 6,259,601 B1 * | 7/2001 | Jaggers et al. | | 361/690 |
| 6,268,998 B1 * | 7/2001 | Cho | | 361/679.23 |
| 6,366,453 B1 * | 4/2002 | Wang et al. | | 361/679.06 |
| 6,392,873 B1 * | 5/2002 | Honda | | 361/679.22 |
| 6,661,649 B2 * | 12/2003 | Tanaka et al. | | 361/679.58 |
| 6,816,364 B2 * | 11/2004 | Helot et al. | | 361/679.06 |
| 6,833,988 B2 * | 12/2004 | Kamphuis et al. | | 361/679.41 |
| 6,894,893 B2 * | 5/2005 | Hidesawa | | 361/679.55 |
| 6,987,666 B2 * | 1/2006 | Medica et al. | | 361/679.05 |
| 7,046,517 B2 * | 5/2006 | Long et al. | | 361/725 |
| 7,072,175 B2 * | 7/2006 | Ho | | 361/679.21 |
| 7,222,395 B2 * | 5/2007 | Vackar | | 16/330 |
| 7,255,317 B2 * | 8/2007 | Huang et al. | | 248/371 |
| 7,280,347 B2 * | 10/2007 | Wong et al. | | 361/679.01 |
| 7,355,844 B2 * | 4/2008 | Lauffer et al. | | 361/679.55 |
| 7,471,511 B2 * | 12/2008 | Montag et al. | | 361/679.41 |
| 7,551,432 B1 | 6/2009 | Bockheim et al. | | |
| 7,636,235 B2 * | 12/2009 | Langberg et al. | | 361/679.23 |
| 7,665,185 B2 * | 2/2010 | Vackar | | 16/330 |
| 7,716,408 B2 * | 5/2010 | Bhatia et al. | | 710/304 |
| 7,724,533 B2 * | 5/2010 | Tanaka et al. | | 361/752 |
| 7,760,500 B2 * | 7/2010 | Gwin et al. | | 361/696 |

(Continued)

OTHER PUBLICATIONS

"Cable Manager & Organize"; http://www.smartdesks.com/computer-desks-fiseries.asp; 4 pages.

(Continued)

*Primary Examiner* — Adrian S Wilson
(74) *Attorney, Agent, or Firm* — Romiwa C. Akpala

(57) ABSTRACT

Embodiments of the present invention disclose a power supply containment device for a computing system. According to one embodiment, the power supply containment device includes a main housing and a clamp portion coupled to the main housing. The clamp portion is configured to extend perpendicularly from the main housing so as to securely hold a power supply between the clamp portion and main housing of the containment device.

18 Claims, 4 Drawing Sheets

(56) References Cited

U.S. PATENT DOCUMENTS

| | | | |
|---|---|---|---|
| 7,773,371 B2* | 8/2010 | Hillman et al. | 361/679.06 |
| 7,793,026 B1* | 9/2010 | Abraham et al. | 710/303 |
| 7,835,154 B2* | 11/2010 | Kunkle et al. | 361/728 |
| 7,852,625 B2* | 12/2010 | Asawa et al. | 361/679.55 |
| 7,883,063 B2* | 2/2011 | Mesfin et al. | 248/162.1 |
| D636,778 S* | 4/2011 | Corsini et al. | D14/434 |
| 2003/0235029 A1* | 12/2003 | Doherty et al. | 361/683 |
| 2004/0190236 A1* | 9/2004 | Medica et al. | 361/683 |
| 2005/0077439 A1* | 4/2005 | Quijano | 248/121 |
| 2005/0141180 A1* | 6/2005 | Umeda et al. | 361/681 |
| 2006/0061958 A1* | 3/2006 | Solomon et al. | 361/686 |
| 2006/0071641 A1* | 4/2006 | Ward | 320/116 |
| 2006/0133021 A1* | 6/2006 | Fan | 361/683 |
| 2006/0168865 A1 | 8/2006 | Watanabe | |
| 2006/0250764 A1* | 11/2006 | Howarth et al. | 361/683 |
| 2006/0250767 A1* | 11/2006 | Brophy et al. | 361/686 |
| 2006/0262232 A1* | 11/2006 | Kuwajima et al. | 348/836 |
| 2006/0274495 A1* | 12/2006 | Nakamura et al. | 361/686 |
| 2007/0146981 A1* | 6/2007 | Titzler et al. | 361/681 |
| 2007/0168593 A1* | 7/2007 | Montag et al. | 710/303 |
| 2008/0158803 A1* | 7/2008 | Sakata | 361/681 |
| 2008/0180898 A1* | 7/2008 | Henderson | 361/683 |
| 2010/0001148 A1* | 1/2010 | Mesfin et al. | 248/162.1 |
| 2010/0188808 A1* | 7/2010 | Howarth et al. | 361/679.41 |
| 2011/0043986 A1* | 2/2011 | Conn et al. | 361/679.02 |
| 2011/0122556 A1* | 5/2011 | Cheng et al. | 361/679.01 |

OTHER PUBLICATIONS

"Setting Up the Dell™ Optiplex™ SFF 980 AIO Stand"; http://support.dell.com/support/edocs/monitors/p2210/en/sff_ug/setup.htm; 9 pages.

* cited by examiner

POWER SUPPLY CONTAINMENT DEVICE

BACKGROUND

Computer system workstations are ubiquitous in today's fast-paced and information-dependent society. Among the many components of traditional computer systems, an electronic-visual display, personal computer, and power source are the most prevalent and standard features of a functional workstation. As advances in technology and the demand for smaller systems increase, manufacturers have developed integrated work centers (IWC) that aid in providing a compact and integrated display and personal computer. These work centers are particularly useful for space-constrained and public computing environments. However, the power source associated with such systems is typically bulky and incompatible with the thin and robust design of the most integrated work centers.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which.

DETAILED DESCRIPTION OF THE INVENTION

Figure 1:
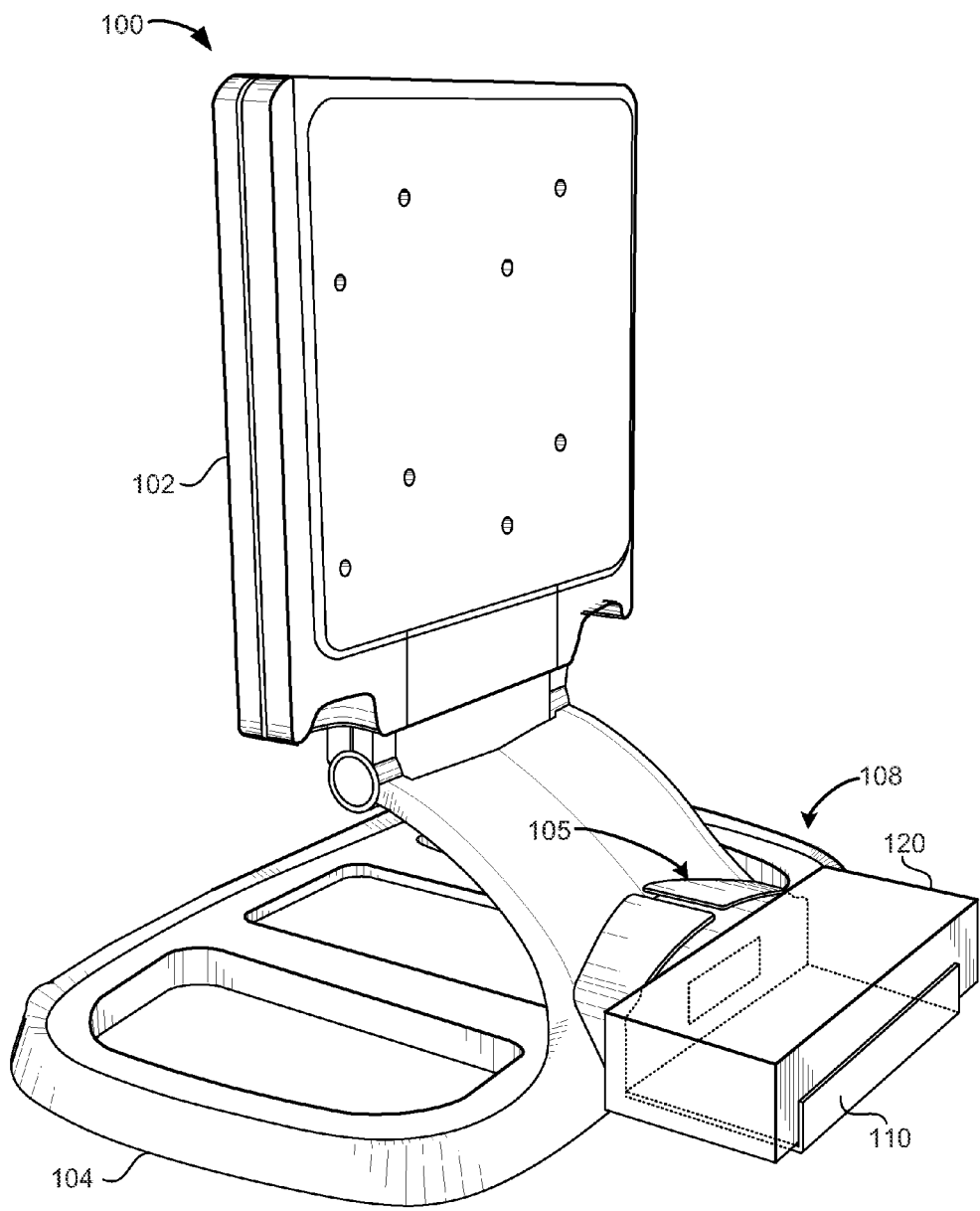
FIG. 1 is a three-dimensional perspective view of an integrated workstation and power supply containment device according to an example of the present invention.

The following discussion is directed to various embodiments. Although one or more of these embodiments may be discussed in detail, the embodiments disclosed should not be interpreted, or otherwise used, as limiting the scope of the disclosure, including the claims. In addition, one skilled in the art will understand that the following description has broad application, and the discussion of any embodiment is meant only to be an example of that embodiment, and not intended to intimate that the scope of the disclosure, including the claims, is limited to that embodiment. Furthermore, as used herein, the designators "A", "B" and "N" particularly with respect to the reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the user of similar digits. For example, 143 may reference element "43" in FIG. 1, and a similar element may be referenced as 243 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Some integrated work centers/workstations include retrofitted Velcro or similar adhesive straps for supporting the power supply. However, since the power supply is only supported at the few points where the Velcro strap or adhesive makes contact, this method fails to provide the requisite force and reliability for secure fastening. Other methods use a built-in casing for supporting an associated power supply. However, the presence of numerous cables coupled with the weight of the power supply often forces the casing open thus causing the power supply to slip and fall in many circumstances.

Examples of the present invention disclose a power supply containment device for a computing system. According to one embodiment, the power supply containment device includes a main housing and a clamp portion coupled to the main housing. The clamp portion is configured to extend perpendicularly from the main housing. Furthermore, rubber padding formed on facing surfaces of the clamp portion and main housing are used to securely hold a power supply module between the clamp portion and main housing of the containment device.

Referring now in more detail to the drawings in which like numerals identify corresponding parts throughout the views, FIG. 1 is a three-dimensional perspective view of an integrated workstation and power supply containment device according to an example of the present invention. As shown here, integrated workstation 100 includes an all-in-one computing device (i.e., display and processing unit) 102, a base stand 104, and a power supply containment device 105. The computing device 102 is attached to the base stand 104 so as to provide an upright viewing angle of the display to an operating user. According to one example, the power supply containment device 105 is affixed to a rear area 108 of the base stand 104 and includes a moveable clamp portion 110. Furthermore and as will be explained in further detail below with reference to additional figures, the moveable clamp portion 110 of the power supply containment device 105 is configured to assist in clamping a power supply module—used to power the computing device—within the containment device 105.

Figure 2:
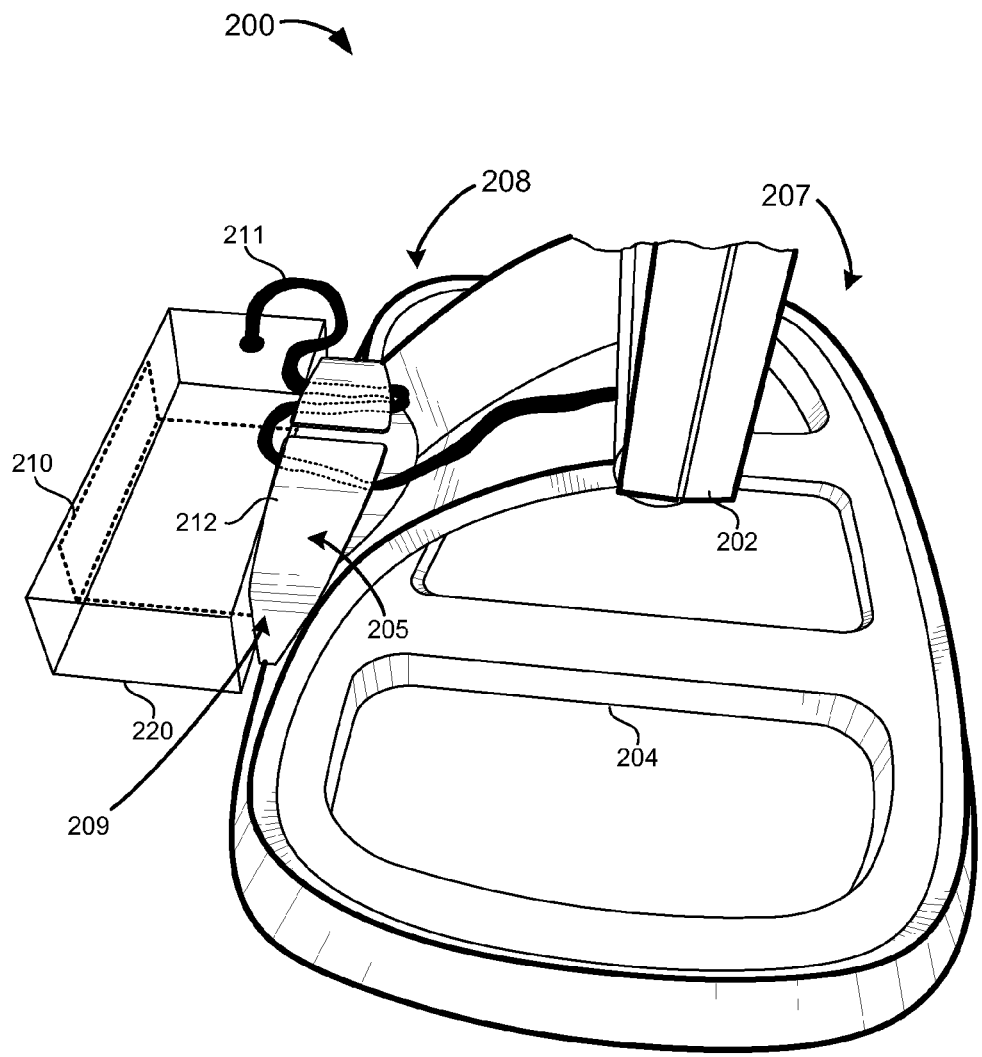
FIG. 2 is another three-dimensional perspective view of an integrated workstation and power supply containment device according to an example of the present invention.

FIG. 2 is another three-dimensional perspective view of an integrated workstation and power supply containment device according to an example of the present invention. As shown in this example embodiment, a power supply containment device 210 is attached to rear area 208 (i.e., area opposite front area 207) of the base stand 204. The power supply module 220 is positioned within the containment device 205 via the clamp portion 210. Furthermore, the power supply module 220 includes cabling 211 coupled to the computing system 202 for providing power thereto. In one example, the containment device 205 includes cable management clip elements 212 for hiding and managing cabling 211 associated with the power supply module 220. As shown here, cabling 211 wraps around and through the clip elements 212. Additionally, upper positioning of the clip elements 212 on the containment device 205 allows the cables 211 of the power supply 220 to be dressed up and over the power supply 220 and main housing 209 of the containment device 205 so as to not interfere with the clamping means while also providing a more aesthetically pleasing design for the integrated workstation 200.

Figure 3A:
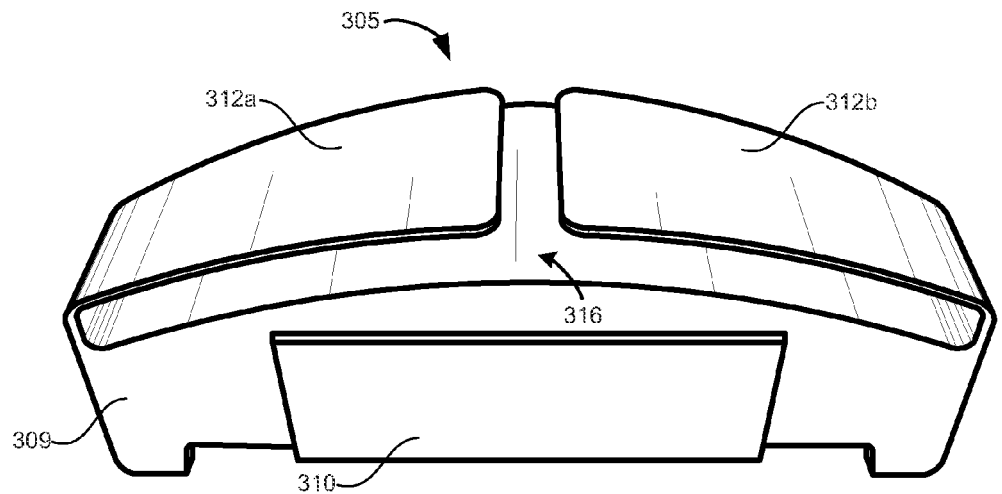
FIGS. 3A and 3B are three-dimensional views of the power supply containment device according to an example of the present invention.
Figure 3B:
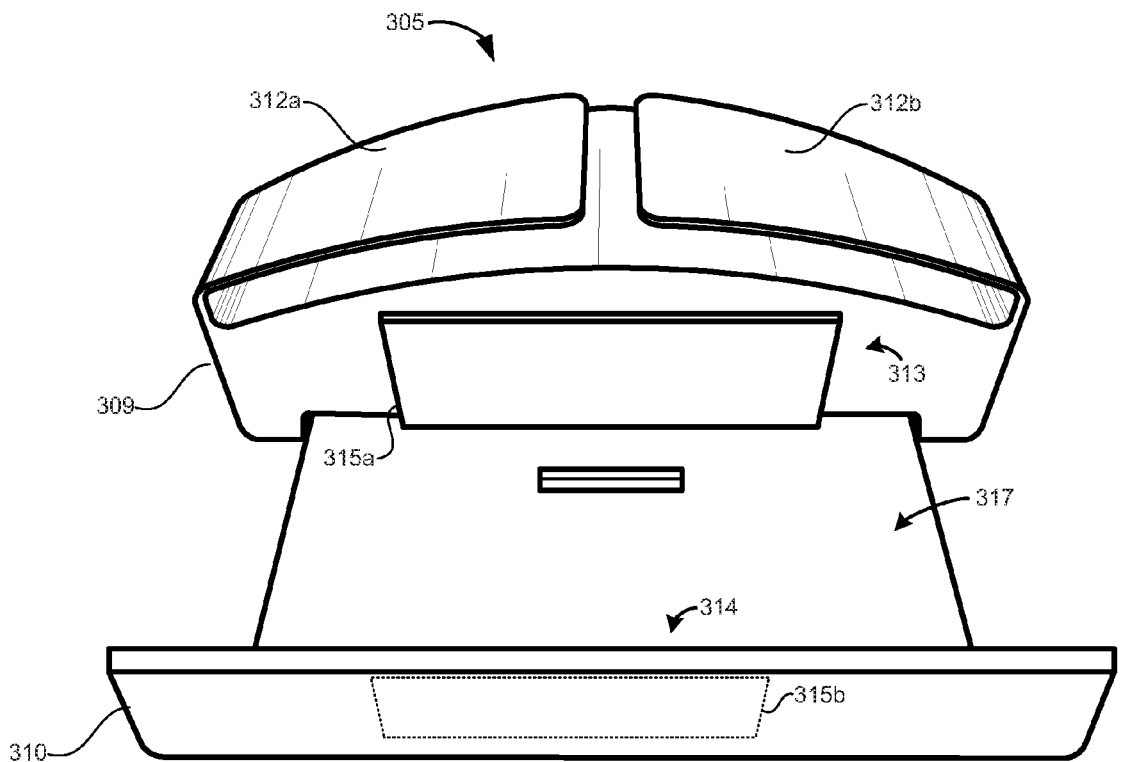

FIGS. 3A and 3B are three-dimensional views of the power supply containment device according to an example of the present invention. FIG. 3A depicts the power supply containment device 305 and clamp portion 310 in a closed or retracted position. More particularly, when in a closed position, the clamp portion 310 of the containment device 305 is immediately adjacent to the main housing 309 of the containment device. According to one example embodiment, a pair of clip elements 312a and 312b are formed on a top surface 316 of the main housing 309 and are utilized to hold and route cables of the power supply module. As shown in FIG. 3B, a perimeter surface 313 of the main housing 309 includes a rubber pad 315a for gripping a surface of the power supply module. Clamp portion 310 also includes a rubber pad 315b formed on an inner surface 314 that is opposite and faces the perimeter surface 313 of the main housing 309. The clamp portion 310 extends perpendicularly away from the perimeter surface 313 of the main housing 309 when in placed in an open or clamping position (similar to a disk tray). As a result, a flat plane or gap area 317 is created between the perimeter surface 313 of the main housing 309 and the inner surface 314 of the clamp portion 310 for receiving the power supply module. Combined with rubber pad 315a, the clamp portion 310 and rubber pad 315b thereof serve to aid in securely positioning the power supply module within gap area 317 as will be described in greater detail with reference to FIGS. 4A-4C. Moreover, due to its compact design, the power supply containment device 305 may be added onto the many existing base stand configurations.

Figure 4A:
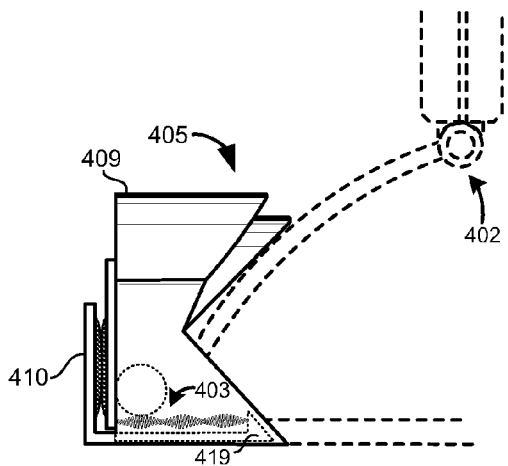
FIGS. 4A-4C are side views of the integrated workstation and power supply containment device according to an example of the present invention.
Figure 4B:
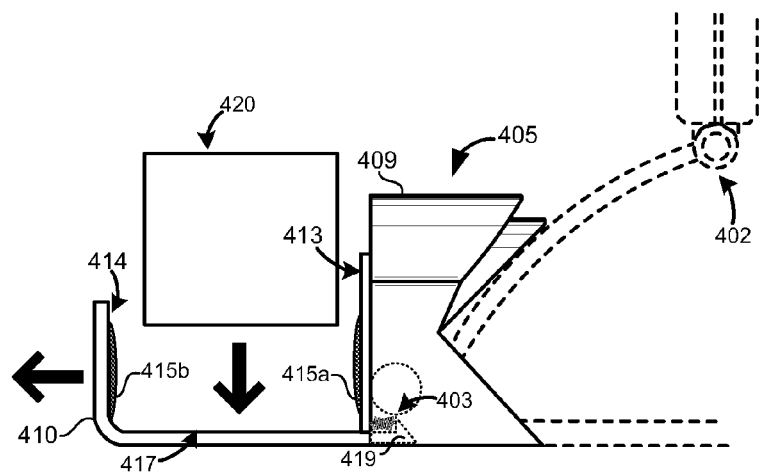
Figure 4C:
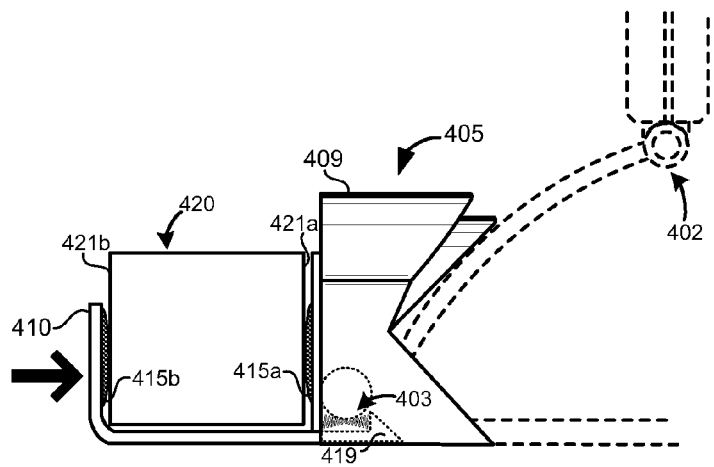

FIGS. 4A-4C are side views of the integrated workstation and power supply containment device according to an example of the present invention. As shown in FIG. 4A, the power supply containment device 405 is affixed to a rear area of the workstation and base stand 402. Here, the clamp portion 410 is in a closed or retracted position in which clamp portion 410 abuts the main housing 409 of the containment device 405. In one example, an adjustment mechanism 403 for the clamp portion 410 is positioned within the main housing 409 of the containment device 405. The adjustment mechanism 403 may be a spring-loaded clamp, adjustable clamp (manually adjustable by a user), latch, or similar mechanical mechanism that allows for protraction and retraction (e.g., paper tray movement) of the clamping portion 410 from/to the main housing 409 while also providing sufficient force to hold an item (i.e., power supply 420, FIGS. 4B-4C) in a fixed position when clamped between surfaces (i.e., inner surface 414, FIG. 4B, of clamping portion and perimeter surface 413, FIG. 4C, of main housing). In the present example, a spring-loaded clamp is represented as the adjustment mechanism 403. As shown here, the spring of the clamp 403 is in a normal extended position when the clamp portion 410 is in the closed position (i.e. adjacent to main housing). Moreover, a tab end 419 of the clamp portion 410 is attached to spring of the clamp 403 for providing the requisite movement of the clamp portion 410 as will be highlighted in the description of the figures below.

With respect to FIG. 4B, the clamp portion 410 is extended outward as indicated by the directional arrow so as to create a flat plane or gap area 417 between surfaces 413 and 414 for placement/insertion of the power supply 420 (as indicated by downward directional arrow). In turn, the tab end 419 of the clamp portion 410 slides perpendicularly with respect to the perimeter surface 413 of the main housing 409 so as to cause the clamp spring 403 to contract as shown in FIG. 4B. As mentioned above, rubber pads 415a and 415b are formed on a perimeter surface of the main housing 407 of the containment device 405 in addition to an inner surface 414 of the clamp portion 410 (i.e., surface opposite the perimeter surface 414 of the main housing 409) respectively. When the clamp portion 410 of the containment device 405 is positioned in an open or clamping position, the rubber pads 415a and 415b are used to prevent the power supply 420 from slippage or lateral movement within the gap area 417 as shown in FIG. 4B. More particularly and according to one example embodiment, once the power supply 420 is positioned with the gap area 417, the clamp portion 410 may be released causing the clamping spring 403 to expand and the clamp portion 410 to retract back (indicated by directional arrow of FIG. 4C) towards the perimeter surface 413 of the main housing 409. Such movement ensures that sufficient force is placed on the opposite contact sides 421a and 421b of the power supply module 420 by rubber pads 415a and 415b of the main housing 409 and clamp portion 410 respectively.

Many advantages are afforded by the containment device of the present examples. Since the clamp portion is adjustable, it may be used with equal effectiveness for power supply modules of different sizes and shapes. Furthermore, the rubber pads of the containment device—in combination with the clamp portion—provide enough force and stability to hold the power supply in a fixed position. Cable management integration combined with the omission of the unsightly and seldom used Velcro straps of prior solutions serves to provide a more aesthetically-pleasing overall look of the workstation. Still further, the containment device may be added to existing integrated workstations with minor modifications thus reducing manufacturing costs while providing seamless integration.

Furthermore, while the invention has been described with respect to exemplary embodiments, one skilled in the art will recognize that numerous modifications are possible. For example, although exemplary embodiments depict an all-in-one computer as the representative computing device, the invention is not limited thereto. For example, the computing device of the workstation may be a television monitor, a notebook computer, a tablet personal computing device, or any other electronic device and workstation having a base stand, supporting structure, or power supply.

Furthermore, the power supply containment device may be positioned at any location with respect to the base stand or workstation. For example, the containment device may be attached to the side or front area of the workstation and base stand. Similarly, the containment device and clamp portion can be formed in varying sizes and shapes rather than those depicted in the figures. Still further, the clamp portion may extend in any direction (e.g., vertically) with respect to the main housing so as to still provide a secure clamping means for the power supply module. Thus, although the invention has been described with respect to exemplary embodiments, it will be appreciated that the invention is intended to cover all modifications and equivalents within the scope of the following claims.

What is claimed is:

1. A power supply containment device for a computer system, the device comprising:
   a main housing having a perimeter surface;
   a clamp portion movably coupled to the main housing so that it can move perpendicularly away from and toward the main housing, the clamp portion having an inner surface facing the perimeter surface, the clamp portion and the main housing, when spaced from each other, defining a gap between the perimeter surface and the inner surface for receiving a power supply; and
   an adjustment mechanism to urge the clamp portion against the power supply so as to clamp the power supply between the inner surface and the perimeter surface.

2. The device of claim 1, further comprising:
at least one clip element attached to the main housing to route cabling associated with the computing system away from the gap.

3. The device of claim 1, wherein the adjustment mechanism includes a spring that urges the inner surface against a side of the power supply, the spring residing at least in part within the main housing.

4. The device of claim 1, wherein when the clamp portion is in the retracted position, the perimeter surface of the main housing is immediately adjacent to the inner surface of the clamp portion.

5. The device of claim 1, wherein both the perimeter surface of the main housing and the inner surface of the clamp portion include respective rubber pads.

6. The device of claim 5, wherein when the clamp portion is in the clamped position, the rubber pads of the main housing and clamp portion grip opposite surfaces of the power supply so as to securely hold the power supply in a fixed position.

7. The device of claim 1, wherein the adjustment mechanism is a spring-loaded clamp.

8. The device of claim 1, wherein the adjustment mechanism is an adjustable clamp manually adjusted by a user.

9. An integrated workstation comprising:
an all-in-one computing device including a display and a processing unit;
a base stand configured to support the all-in-one computing device;
a power supply module for powering the display and the processing unit;
a containment device including,
a main housing fixed to the base stand, the main housing including a perimeter surface, and
a clamp portion movably attached to the main housing so that the clamp portion can move toward and away from the perimeter surface, the clamp portion including an inner surface facing the perimeter surface, the perimeter surface and the inner surface defining a gap for containing the power supply when the inner surface is spaced from the perimeter surface; and
an adjustment mechanism to urge the clamp portion against the power supply so as to clamp the power supply between the inner surface and the perimeter surface.

10. The integrated workstation of claim 9, wherein the main housing of the containment device includes a pair of cable clips for routing cabling away from the gap.

11. The integrated workstation of claim 9, wherein the display is front facing and the gap is rearward of the main housing.

12. The integrated workstation of claim 11, wherein the adjustment mechanism includes a spring for urging the inner surface against a side of the power supply, the spring residing at least in part within the main housing.

13. The integrated workstation of claim 10, wherein when the clamp portion is in the retracted position, the perimeter surface of the main housing is immediately adjacent to the inner surface of the clamp portion.

14. The integrated workstation of claim 10, wherein the contact surface of the main housing and the inner surface of the clamp portion include respective rubber pads.

15. The integrated workstation of claim 14, wherein when the clamp portion is in the clamped position, the rubber pads of the main housing and clamp portion grip opposite surfaces of the power supply so as securely hold the power supply in a fixed position.

16. A method comprising:
protracting a clamp portion of a containment device rearward of a main housing so as to form a gap between an inner surface of the clamp portion and a perimeter surface of the main housing, the containment device being attached to a stand supporting an all-in-one computer device including a front-facing display and a processing unit;
installing a power supply in said gap;
urging the clamp portion forward so that the inner surface presses against a side of the power supply so as to secure it between the inner surface and the perimeter surface; and
using the power supply to power the front-facing display and the processing unit.

17. The method of claim 16 wherein the urging includes the use of a spring residing at least in part within the main housing.

18. The method of claim 16 further comprising securing cabling with a clip attached to the main housing so as to secure the cabling away from the gap, the cabling being to deliver power from the power supply to the front-facing display and the processing unit.

* * * * *